(12) United States Patent
Losot et al.

(10) Patent No.: US 11,648,751 B2
(45) Date of Patent: May 16, 2023

(54) SIDE LAMINATED AUTOMOTIVE GLAZING

(71) Applicant: AGC GLASS EUROPE, Louvain-la-Neuve (BE)

(72) Inventors: Rostislav Losot, Louvain-la-Neuve (BE); Sylvain Drugman, Morlanwelz (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 355 days.

(21) Appl. No.: 16/613,645

(22) PCT Filed: May 8, 2018

(86) PCT No.: PCT/EP2018/061789
§ 371 (c)(1),
(2) Date: Nov. 14, 2019

(87) PCT Pub. No.: WO2018/210612
PCT Pub. Date: Nov. 22, 2018

(65) Prior Publication Data
US 2021/0100074 A1  Apr. 1, 2021

(30) Foreign Application Priority Data
May 19, 2017  (EP) ..................................... 17171943

(51) Int. Cl.
*B32B 1/04*  (2006.01)
*B32B 3/06*  (2006.01)
(Continued)

(52) U.S. Cl.
CPC .......... *B32B 17/10293* (2013.01); *B32B 1/04* (2013.01); *B32B 3/06* (2013.01);
(Continued)

(58) Field of Classification Search
CPC ................ H05B 3/86; H05B 2203/013; H05B 2203/016; B32B 3/266; B32B 7/12;
(Continued)

(56) References Cited

U.S. PATENT DOCUMENTS

| 3,529,074 A | 9/1970 | Lewis | |
|---|---|---|---|
| 4,321,296 A * | 3/1982 | Rougier | H05B 3/86 |
| | | | 428/113 |

(Continued)

FOREIGN PATENT DOCUMENTS

| CN | 202857021 U * | 4/2013 | ....... B32B 17/10174 |
|---|---|---|---|
| DE | 3012073 A * | 10/1981 | ............. C01B 33/32 |

(Continued)

OTHER PUBLICATIONS

Machine Translation of EP0418123A1, Mar. 1991 (Year: 1991).*

(Continued)

*Primary Examiner* — Jeffrey A Vonch
(74) *Attorney, Agent, or Firm* — Oblon, McClelland, Maier & Neustadt, L.L.P.

(57) ABSTRACT

An electrically heatable laminated automotive glazing unit including an exterior glass sheet that is curved and tempered and a thin glass interior sheet that is also tempered, these sheets being joined by means of a thermoplastic interlayer sheet. The glazing unit is configured to receive mechanical moving and/or fastening means and a portion of the exterior sheet is not covered by the thin interior sheet. The glazing unit is fastened in the zone not covered by the thin sheet, and the glazing unit includes at least one electrically heatable zone comprising (i) a substantially transparent, electrically conductive coating layer and (ii) spaced busbars adapted to supply electrical voltage across the substantially transparent, electrically conductive coating layer. The spaced busbars are (Continued)

placed in the portion of the exterior sheet which is not covered by the thin interior sheet.

21 Claims, 1 Drawing Sheet

(51) Int. Cl.
    *B32B 3/24*     (2006.01)
    *B32B 17/10*     (2006.01)
    *H05B 3/84*     (2006.01)
    *B60J 1/08*     (2006.01)
    *B32B 3/26*     (2006.01)
    *B32B 7/12*     (2006.01)
    *B32B 27/30*     (2006.01)
    *B60J 1/00*     (2006.01)
    *B60J 1/17*     (2006.01)
    *H05B 3/86*     (2006.01)

(52) U.S. Cl.
    CPC ............... *B32B 3/266* (2013.01); *B32B 7/12* (2013.01); *B32B 17/1022* (2013.01); *B32B 17/10036* (2013.01); *B32B 17/10091* (2013.01); *B32B 17/10174* (2013.01); *B32B 17/10302* (2013.01); *B32B 17/10385* (2013.01); *B32B 17/10761* (2013.01); *B32B 27/306* (2013.01); *B60J 1/001* (2013.01); *B60J 1/002* (2013.01); *B60J 1/006* (2013.01); *B60J 1/008* (2013.01); *B60J 1/08* (2013.01); *H05B 3/84* (2013.01); *B32B 17/10137* (2013.01); *B32B 17/10889* (2013.01); *B32B 17/10981* (2013.01); *B32B 2250/44* (2013.01); *B32B 2255/205* (2013.01); *B32B 2255/28* (2013.01); *B32B 2307/102* (2013.01); *B32B 2307/202* (2013.01); *B32B 2307/302* (2013.01); *B32B 2307/402* (2013.01); *B32B 2307/412* (2013.01); *B32B 2307/416* (2013.01); *B32B 2307/546* (2013.01); *B32B 2307/558* (2013.01); *B32B 2307/732* (2013.01); *B32B 2329/06* (2013.01); *B32B 2605/006* (2013.01); *B60J 1/17* (2013.01); *H05B 3/86* (2013.01); *H05B 2203/011* (2013.01); *H05B 2203/013* (2013.01); *H05B 2203/016* (2013.01); *Y10T 428/2495* (2015.01); *Y10T 428/24752* (2015.01); *Y10T 428/24777* (2015.01); *Y10T 428/24967* (2015.01)

(58) Field of Classification Search
    CPC ........ B32B 17/10036; B32B 17/10137; B32B 17/1022; B32B 17/10302; B32B 17/10385; B32B 17/10761; B32B 2255/205; B32B 2255/28; B32B 2307/102; B32B 2307/402; B32B 2307/416; B32B 2307/546; B32B 2307/732; B32B 2605/006; Y10T 428/24273; Y10T 428/24322; Y10T 428/24628; Y10T 428/24752; Y10T 428/24777; Y10T 428/24926; Y10T 428/24942; Y10T 428/2495

USPC ....... 428/131, 137, 174, 189, 212, 213, 215, 428/220
    See application file for complete search history.

(56) References Cited

U.S. PATENT DOCUMENTS

| | | | |
|---|---|---|---|
| 2005/0221062 A1* | 10/2005 | Mann ................ | B32B 17/10293 428/210 |
| 2007/0184282 A1* | 8/2007 | Hauser .............. | B32B 17/10036 428/426 |
| 2008/0035629 A1 | 2/2008 | Thiry et al. | |
| 2009/0066167 A1* | 3/2009 | Suzuki .................. | H02G 11/00 174/1 |
| 2009/0169877 A1* | 7/2009 | Dixon ............... | B32B 17/10036 428/339 |
| 2014/0141206 A1 | 5/2014 | Gillard et al. | |
| 2014/0238967 A1* | 8/2014 | Boyce ....................... | B60P 1/00 219/203 |
| 2015/0181653 A1* | 6/2015 | Lesmeister .............. | H05B 3/06 219/203 |
| 2015/0224855 A1 | 8/2015 | Legrand | |
| 2015/0343744 A1* | 12/2015 | Ogawa .............. | B32B 17/10651 219/201 |
| 2016/0041331 A1* | 2/2016 | Odulinski ............ | G02B 6/0073 362/613 |
| 2016/0240935 A1* | 8/2016 | Katakura ................. | H05B 3/06 |
| 2019/0389429 A1* | 12/2019 | Chiba ...................... | H05B 3/86 |

FOREIGN PATENT DOCUMENTS

| | | | | |
|---|---|---|---|---|
| DE | 102004029164 A1 * | 12/2005 | ............. | B32B 17/10 |
| DE | 102013007381 A1 * | 10/2014 | ................ | B60J 1/17 |
| DE | 10 2015 014 330 A1 | 5/2017 | | |
| DE | 102015014330 A1 * | 5/2017 | | |
| EP | 418123 A1 * | 3/1991 | | |
| EP | 451608 A * | 10/1991 | ....... | B32B 17/10174 |
| EP | 490723 A1 * | 6/1992 | ....... | B32B 17/10036 |
| EP | 1710104 A2 * | 10/2006 | ....... | B32B 17/10036 |
| EP | 1908584 A1 * | 4/2008 | ............. | B32B 15/08 |
| FR | 2796764 A1 * | 1/2001 | ............. | B60J 1/005 |
| GB | 2125732 A * | 3/1984 | ....... | B32B 17/10174 |
| JP | 52056047 U * | 4/1977 | ............. | C01B 33/32 |
| JP | 63149935 U * | 10/1988 | ....... | B32B 17/10036 |
| JP | 2000283482 A * | 10/2000 | | |
| JP | 2003221968 A * | 8/2003 | | |
| JP | 2009006741 A * | 1/2009 | | |
| JP | 2016201343 A * | 12/2016 | | |
| WO | WO-2007057461 A1 * | 5/2007 | ....... | B32B 17/10036 |

OTHER PUBLICATIONS

Machine Translation of DE-102013007381-A1, Oct. 2014 (Year: 2014).*
Machine Translation of DE-102015014330-A1, May 2017 (Year: 2017).*
Machine Translation of JP-52056047-U, Apr. 1977 (Year: 1977).*
Machine Translation of JP-63149935-U, Oct. 1988 (Year: 1988).*
International Search Report dated Jul. 3, 2018 in PCT/EP2018/061789 filed May 8, 2018.

* cited by examiner

SIDE LAMINATED AUTOMOTIVE GLAZING

The invention relates to side laminated automotive glazing units. More particularly, the present invention relates to a heated coated thin side automotive glazing.

Side windows conventionally consist of relatively thick, monolithic glass sheets. However, for their most advanced models manufacturers would like to provide glazing units having the best available properties. These are especially glazing units having anti-intrusion and acoustic attenuation qualities, athermic properties and today more and more heating-coated properties, etc. In practice, to obtain such glazing units it is necessary to use laminated products.

In the case of heatable glazing panels comprising an electrically conductive coating layer, electrical current is brought to a conductive coating layer through, for example, metallic bus bars, which are substantially parallel one to another. In this particular case the distance between the bus bars along their whole length remains substantially the same. The electrical resistance of the current path along the length of the bus bars is therefore substantially the same. When submitting such glazing panels to a given voltage, the amount of heat generated will be substantially uniform throughout the whole surface of the glazing panel covered with the conductive coating layer.

In the case of side lite heatable glazing panels of substantially irregular shape, for example glazing panels with application in the automotive, railway or aeronautical field and more particularly side window, spaced bus bars which diverge at at least one portion along their length may be used. The distance between the bus bars therefore varies and consequently the electrical resistance of the current path also varies. Therefore, when submitting such glazing panels to a given voltage, the amount of heat generated will vary along the length of the bus bars, thereby creating the risk of local areas of overheating which may damage or destroy the conductive coating layer. Furthermore, when such heatable glazing panels are used for de-misting or de-icing purposes, certain areas may demist or deice more rapidly than others. This may create problems of visibility for an observer looking through such a glazing panel. On the other hand, some area of the glazing panels might be submitted to too low amount of heat. Consequently, the de-misting or de-icing will occur after a very long time.

The substitution of laminated glazing units for monolithic glazing units such as those traditionally used for side windows or rear windows leads to the search for assemblies of glass sheets with relatively small thicknesses. These glazing units are mostly formed from sheets of toughened glass with a thickness in the order of 5 mm. The replacement of these monolithic sheets by laminated assemblies results in the use of glass sheets with thicknesses of mostly less than 3.5 mm. This reduction is all the more necessary when the laminated assemblies comprise a thermoplastic interlayer sheet, which adds to the thickness of the assembly, and one of the questions raised in this substitution idea is to also provide the laminated option in parallel with that of the monolithic glazing in the same model without modifying the elements, in which these glazing units are integrated, in particular the slide rails of movable side windows.

Today, car manufacturers are increasingly demanding lighter glazing units. The reduction in weight of the glazing units is the effect of reductions in thickness of the glass sheets that form them. The choice of lighter glazing units does not change the requirements as regards the qualities of these glazing units, whether these relate to mechanical strength or optical qualities and today heating properties.

The use of thin glass or ultrathin glass (<1 mm) in the laminated glazing and particularly as inner glass to produce a heatable coated side laminated window is very interesting for car manufacturer particularly to decrease the weight of the glass. This weight reduction will reduce the energy consumption of the car, but it will also move down the centre of gravity of the vehicle, and so better stability of the car as well as better driving behaviour. Nevertheless, by using an asymmetrical glazing to produce a heatable coated side window raises the problem of the position of the busbar(s).

Indeed, if a heated coated laminated side window is needed, the use of busbars to supply the current to heat the coating is problematical. The use of busbars leads to lamination issues due to the thickness of the busbar(s) in view of the thin thickness of the inner glass sheet, particularly when an ultrathin glass is used as for example an inner glass sheet (thickness less than 1 mm). Indeed, bubbles in the laminate may occur due of the presence of the busbar and deformation of the ultrathin glass may occurs due to in thin thickness leading to a delamination of the laminate or breakage of the window.

Thus the formation of side laminated glazing units of low thickness raises some questions as described above in particular when the glazing units have to be heated and bent.

Thus, the present invention proposes a solution to the above cited problem namely the use and accordingly the position of the busbars to supply the current into a heatable coated side laminated asymmetrical window.

Accordingly, the present invention concerns an electrically heatable laminated automotive glazing unit comprising an outer glass sheet that is curved and tempered and a thin glass inner sheet that is also tempered, these sheets being joined by means of a thermoplastic interlayer sheet, the glazing unit is configured to receive mechanical moving and/or fastening means and a portion of the exterior sheet is not covered by the thin interior sheet, and the glazing unit is fastened in the zone not covered by the thin sheet, the glazing unit comprising at least one electrically heatable zone comprising:
  i) a substantially transparent, electrically conductive coating layer,
  ii) spaced busbars adapted to supply electrical voltage across the substantially transparent, electrically conductive coating layer,
characterized in that spaced busbars are placed in the portion of the outer sheet which is not covered by the thin inner sheet.

By placing the spaced busbars in the portion of the outer sheet which is not covered by the thin inner sheet, the problem of delamination or formation of bubbles wherein busbar(s) is placed due to its thickness in comparison with the thickness of the inner glass sheet, are limited even avoided.

Furthermore, the formation of laminated glazing units of low thickness and particularly a heated coated glazing, raises some questions in particular when the glazing units have to be bent.

The techniques that include a heat treatment, whether this is a bending or toughening operation for glass sheets of low thickness, are likely to impose particular measures to ensure that satisfactory properties are maintained, optical properties in particular but also mechanical properties. For example, thermal toughening of the sheets is a much more delicate operation when the glass sheet is thin. Bending sheets, in particular bending two sheets simultaneously, also raises specific problems particularly when the two sheets have different thicknesses.

The aim of the invention is to enable heatable side laminated and curved glazing units with a low thickness to be obtained that also have all the mechanical or optical properties and heatable properties required by the car manufacturers, in particular to meet the standards in this field. The set aim must be achieved without necessitating costly treatments or those where the yields would be inadequate.

The prior art includes a large number of techniques dedicated to the production of curved heatable laminated glazing units and particularly heatable side glazing for automotive. In the most widespread techniques, busbars to supply with a current the heated coating are placed inside the laminated glazing. In the most widespread techniques, starting from superposed plane sheets, the busbars are sandwiched between the two glass sheets and the bending operation is conducted on both sheets simultaneously. In these techniques, the traditional methods used endeavour to ensure as far as possible that during the bending operation the two superposed sheets are in conditions that are as similar as possible.

To take into consideration the difficulties encountered in these techniques including the bending of two asymmetrical sheets provided with a heated coating supplied with a current through busbars, or also to minimise the production costs, other techniques are also known from the prior art, in particular those in which the two sheets are bent separately and/or busbars are placed inside the laminated glazing on left edge and right edge or on upper and bottom part of the glazing in the two sheets laminated part. This type of operation is not without its difficulties. The pairing of sheets often reveals that the shapes obtained are not strictly the same and deformation of the glazing appears due to thickness of the busbsars in case of used thin or ultrathin glass, and this poses problems during assembly and ultimately for the optical and physical properties of these glazing units.

The invention proposes a heatable coated curved laminated side glazing for automotive and method to produce it.

To form these laminated glazing units of low thickness the invention proposes as one of its principles to assemble two glass sheets of different thickness, which also have different shapes before assembly, wherein the previously bent thickest sheet predominantly determines the final shape of the assembly. In other words, in the operation for assembly of the two sheets leading to the final laminated glazing, the thinnest sheet undergoes a deformation operation that substantially moulds it to the shape of the thicker sheet. In this operation the thick sheet can also undergo some modification in its shape, but this is very limited and sufficiently reduced so that the shape of the final laminated glazing can be assimilated to that of the thick sheet before its assembly.

To reach this result, it is necessary that the mechanical bending strength characteristics of the two sheets are sufficiently different. The thickness of the sheets predominantly determines the bending behaviour. For the thicker sheet to be able to impose its shape, its thickness is several times that of the thinner sheet. According to the invention, the ratio of the thicknesses is at least 7:1 and preferably 5:1. The higher this ratio is, the closer the curve of this laminated glazing conforms to that of the thicker sheet.

For the choice of technique in particular for the production of glazing units with thicknesses that are not greater than those of previous monolithic glazing units, the thickness of the laminated glazing units according to the invention is essentially in the order of 5 mm at most, that is including the thickness of the thermoplastic interlayer sheet.

The thermoplastic sheets used are traditional sheets. Thus, this mostly relates to a polyvinyl butyral sheet (PVB) commercially available in thicknesses of 0.38 or 0.76 mm. The formation of the glazing units according to the invention does not require specific thicknesses. Combinations of several sheets are also possible. However, in practice, the most frequent choice will be to use the available sheets, possibly after these have undergone a drawing operation using practices known in this field. In practice, the preference is to use an interlayer sheet with a thickness not greater than 0.8 mm, whatever the nature of this sheet.

The thermoplastic sheet is according to one embodiment of the present invention co-extensive with the outer glass sheet.

On the basis of the above, in the glazing units according to the invention the combined thicknesses of the two glass sheets advantageously does not exceed 5 mm (without PVB).

As a result of the conditions indicated above, the second glass sheet, which must undergo a significant deformation during assembly, is necessarily relatively thin. The thinner it is, the easier the shaping.

To benefit from the advantages associated with the reduction in thickness, it is preferred to choose the second sheet with a thickness at most equal to 0.8 mm and preferably at most equal to 0.6 mm. Sheets as thin as 0.4 are also well suited to the products according to the invention.

However, in the case of the thickest sheet of the laminated structure, its thickness remains limited so as not to compromise the benefit of reducing the weight of the assembly. This sheet preferably does not have a thickness of more than 4 mm and particularly preferred not more than 3.2 mm and more particularly preferred not more than 2.1 mm. For the laminated glazing units with the lowest thickness, the "thick" sheet can be as thin as 1.6 mm or even less, in particular 1.2 mm.

Apart from the thickness of the sheets, the difference in their shapes before assembly is also a determining factor for providing a glazing unit that will be stable in quality over time. The stresses introduced into the sheets must in fact remain within the limits that the laminated glazing unit can withstand without risk of subsequent modification or without impairing the properties of the glazing units, in particular the mechanical properties.

This is particularly true in case of glazing provided with busbars to bring current through an electrically conductive coating layer provided on the surface of one of the glass sheet.

The limits in the assembly conditions can also be expressed in relation to the curvatures imposed on the glazing units. The significance of the curvatures imposed taking into account the thicknesses of the sheets forms another approach for the conditions that should preferably be adhered to in the production of the glazing units according to the invention.

Advantageously, the major curvature of the first sheet must not have a radius of less than 1 m, preferably not less than 1.5 m. The minor curvature, defined in a perpendicular direction of the major curvature direction, must not have a radius of less than 5 m, preferably not less than 5 m.

Moreover, the possible curvatures take into account the deformation that can be withstood by the second sheet. If this second sheet is not plane, but is itself initially curved, the final curvature can be more easily shaped and the resulting deformation of the second sheet remains limited. For the glazing units according to the invention the ratio of the smallest radii of curvature of the second sheet, $R_2$, to those of the first sheet, $R_1$, is advantageously such that $R_2/R_1>2$ and preferably $R_2/R_1>10$. The ratio is infinite when, in the preferred case, the second sheet is plane.

With respect to the mechanical strength of the sheets, one must also take into consideration the fragility that can originate from the edges of the sheets. The presence of microcracks at the edges of the glass sheets is known to generate fractures if no measures are taken to stabilise these. The most usual method to reduce or eliminate these cracks in monolithic sheets of the prior art is to conduct a careful "grinding" of the edges. The grinding of the edges of the thinnest sheets is a delicate operation because of their fragility. If the grinding cannot be conducted or cannot be sufficient to protect the sheets, in particular the thin sheets, prevention of the commencement of fracture is advantageously achieved or completed by introducing compression stresses into the edges of the sheets.

In the case of the monolithic, and therefore relatively thick, glazing units of the prior art, the prevention of fractures starting from the edges is achieved mostly by a thermal toughening operation.

The thermal toughening of thin sheets is a difficult operation. The thermal inertia is reduced so that it is difficult to maintain an adequate temperature in the bulk of the sheet. When this thermal toughening is too delicate an operation for the thin sheets, the toughening for the second sheet in particular is advantageously conducted chemically using traditional techniques. In these techniques the aim is to substitute constituents such as sodium with elements of greater volume such as potassium.

The techniques of assembling the sheets must include a pressure exerted onto the superposed sheets, between which the thermoplastic interlayer sheet has been placed, and an increase in temperature leading to the adhesion of the thermoplastic sheet to the two glass sheets. To assure contact between the three superposed elements, it is advantageous to apply a vacuum between the two glass sheets so that the external pressure is exerted uniformly on the entire surface of these two sheets.

According to the traditional implementation techniques, the vacuum can be obtained in an airtight flexible envelope of material, in which the assembly of the elements of the glazing is positioned. In this case the pressure is exerted by means of the envelope in question. It is also possible, likewise in a known manner, to arrange a ring to cover only the periphery of the glazing.

Whatever method is used to assure the pressure on the assembly to be laminated, this pressure must be sufficient to apply the two glass sheets firmly against one another with the thermoplastic sheet between them.

When the sheets are thus pressed against one another, the temperature is brought to a level that renders the thermoplastic material adherent by contact with the glass. The temperature remains limited so as not to lead to an excessive softening of the thermoplastic material. In the case of polyvinyl butyral, which constitutes the most usual thermoplastic material, the temperature is in the order of 100 to 120° C.

Subsequent to the step leading to the adhesion of the glass sheets by means of the thermoplastic sheet, the laminated glazing is usually insufficiently transparent. The subsequent treatment consists of passage through an oven under pressure and at a higher temperature than that previously applied for the adhesion. In the case of a polyvinyl butyral interlayer, the temperature reached increases to about 140° C., for example.

The production methods for the laminated glazing units according to the invention can be applied to all glasses customarily used to form automotive glazing units. These are clear glasses, but also coloured glasses, i.e. glasses with a very low light transmission such as glasses referred to as "privacy" glasses.

The glasses used in the laminated structure are either identical or different. As indicated in the introduction, an advantage of the considered technique is to provide possibilities for pairing sheets that in traditional simultaneous bending techniques would not readily lead to shapes that can be perfectly superposed.

It is also possible according to the invention to cover one or other of the two sheets, or both sheets, with functional layers. These are usually layers of enamel, for example, for masking elements that are not aesthetically pleasing, such as beads of glue for securing these glazing units. Above all, these are functional layers that provide the glazing with infrared reflective properties to ensure thermal comfort inside the vehicle.

Layer systems that selectively reflect infrared rays are known to be relatively fragile at the temperatures required for bending that lie at about 650-700° C. A potential advantage of the glazing units according to the invention is to allow curved glazing units to be obtained without the sheet to which the layer system is applied being subjected to these elevated temperatures. For this, it is selected to apply the layer system to the thin layer that is preferably only bent by the deformation performed during the course of the assembly.

The glazing units according to the invention can additionally include interlayer components comprising functional elements otherwise known. These are, for example, interlayers comprising photovoltaic cells or elements that are electrically controlled to modify the features of light transmission: electrochromic elements, suspended particles . . . .

Other functions are also associated with the nature of the interlayer. In particular, the glazing units can be configured by integrating an interlayer that has sound absorption properties. These interlayers can compensate in particular at least for part of the reduction in thickness of the glass sheets with their contribution to this sound absorption.

The inventions are further understood as illustrated by the following figures:

FIG. 1a is a schematic view of a glazing unit according to one embodiment of the present invention.

FIG. 1b is a side view, of a cross section along A-A, of the glazing unit in FIG. 1a.

Figures 1A, 1B:
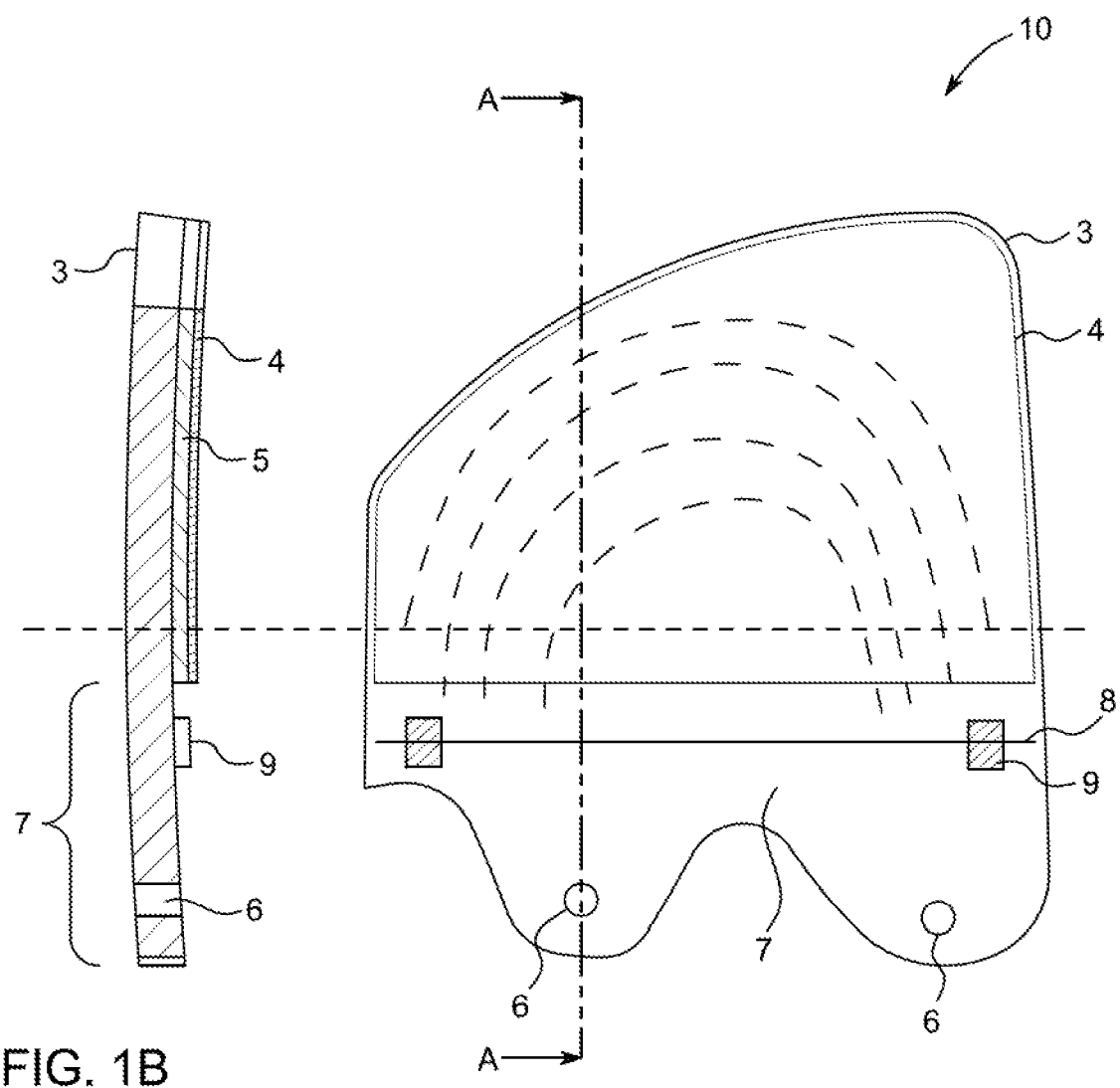

According to an embodiment of the present invention as shown in FIGS. 1a and 1b, the laminated automotive glazing unit 10 according to the present invention, comprises an exterior glass sheet 3 that is curved and thermally tempered and an ultrathin glass interior sheet 4 that is chemically tempered, these sheets being joined by means of a thermoplastic interlayer sheet 5, wherein the glazing unit is configured by holes 6 to receive mechanical moving and/or fastening means, a portion 7 of the exterior sheet is not covered by the thin interior sheet, and the glazing unit is fastened in the zone not covered by the thin sheet. An electrically conductive coating 8 is formed on one surface of the exterior glass sheet. The electrically conductive coating is connected to busbars 9 formed on the portion 7 of the exterior glass sheet not covered by the thin interior glass sheet.

By their composition, glazing units according to the invention may provide the advantages of laminated glazing units while guaranteeing in particular the necessary mechanical strength of tempered monolithic glazing units.

The two sheets of the assembly are very different in their structure. The curved exterior sheet is sufficiently thick so that when joined to the thin interior sheet, it imposes its shape on the latter. It is tempered or semi-tempered in order to provide the required strengths. Tempered glass has, under standard conditions, an instantaneous flexural strength of about 60 MPa; the instantaneous flexural strength of semi-tempered glass is only about 40 MPa.

Joining a curved sheet to a sheet that is not, or the curvature of which is not significant, is subject to conditions that especially depend on their respective properties, their thicknesses to start with. In the case of "low-weight" laminated glazing units, these conditions are especially detailed in patent application PCT/EP2012/061557 filed 18 Jun. 2012, incorporated here by reference. Whether or not the glazing unit is a low-weight glazing unit, these conditions are moreover detailed below.

If the curvature of the joined sheets is significant, the ratio of the thicknesses of the curved sheet to the thicknesses of the sheet that is not must preferably be at least 7/1 and advantageously at least 5/1. Although there is no upper limit to this ratio, practical conditions related to the total thickness of the glazing unit and to those of each of the sheets nevertheless lead to a ratio that in practice does not exceed 12/1.

The thickness ratio advantageously increases as the radius of curvature imposed on the thin sheet, which is essentially flat before assembly, decreases.

The aforementioned PCT patent application in particular mentions the fact that the surface stresses induced in the thin sheet when it is joined to the thick sheet must in general not exceed about 50 MPa. The stress withstood depends on curvature and increases as radius of curvature decreases. The application in question gives by way of example the stresses induced for different thicknesses depending on this radius of curvature.

For models for which manufacturers are not seeking to decrease glazing-unit weight, the thick sheets according to the invention may be as much as 5 mm or more in thickness.

For the thin sheet, the choice of its thickness is conditioned by its ability to match the curvature of the thick sheet. The smaller its thickness, the more complex shape can be proceeded with higher radius or curvature. The thickness of this sheet is advantageously at most 1 mm and preferably at most 0.8 mm. It is possible to produce sheets as thin as 0.1 mm, nevertheless for the sake of ease of implementation, it is preferable for the sheet to have a thickness of at least 0.2 mm.

Shaping glass sheets of very small thickness is a delicate process and causes problems with reproducibility. Insofar as the final curvature of the laminated glazing unit is that imposed by the thick sheet, it is neither necessary nor advantageous for the thin sheet to have a curvature before its assembly.

The limits in the assembly conditions can also be expressed in relation to the presence of busbars imposed on the heatable coated side window provided with two asymmetrical glass sheets based on its thickness and its shapes (bottom part of the outer glass sheet not covered by the ultra-thin inner glass sheet).

According to the present invention, the busbars is placed on the bottom part of the outer glass sheet of the glazing not covered by the inner thin glass sheet.

Preferably, the busbar is placed on the lower part of the outer glass sheet of the glazing not covered by the inner thin glass sheet in the limit with the lower edge of the thin or ultra thin inner glass sheet.

Preferably the heated coating is provided on face 2 on the laminated glazing. According to the invention, the busbars and all electrically conductive connection elements are arranged along the lower edge. The distance between the busbars and connection elements extend along the lower edge, is less than 10 cm, preferably less than 5 cm. the current is led by the de-coating design. The length of the busbars depends on the design of the electrically conductive coating, in particular on the number and width of the segments to be contacted, and can be appropriately selected in the individual case by the person skilled in the art. The term "length" of the typical strip-type busbar means its longer dimension, along which is customarily contacted with the various segments of the coating. According to one embodiment of the present invention, busbars extending along the lower edge of the outer glass are made of several pieces (+ and −) and are covered/protected by a PET layer to avoid moisture penetration. PET is fixed on the glass preferably with EVA, COP or PVB.

According to the present invention, the bus bars are located along the length of a same part on the lower part of the outer glass sheet of the glazing not covered by the inner thin glass sheet in the limit with the lower edge of the thin or ultra thin inner glass sheet of the glazing panel; this may facilitate masking of the bus bars from view, for example, by covering the bus bars with an enamel or other masking agent or by arranging for the bus bars to be hidden in use, for example by part of the bodywork of a vehicle.

The heat generated when applying a voltage across the spaced bus bars may be substantially the same over the whole surface of the glazing panel. This may be assessed, for example, by comparing the average temperature at one 5 cm2 area of the glazing panel and comparing this with the average temperature at another, spaced 5 cm2 area of the glazing panel, particularly when the glazing panel has been heated for a sufficient length of time for it to reach a stable or equilibrium temperature with its surroundings. In one embodiment, the glazing panel may thus be de-iced or de-misted substantially uniformly.

Advantageously, at least one portion of the conductive path extends substantially from a lower edge of the glazing panel to an upper edge of the glazing panel. In this embodiment heat may be generated at substantially the same time at the upper edge and at the lower edge of the glazing panel affording uniform heating at both these edges of the glazing panel.

Preferably, the glazing panel is substantially covered with the electrically conductive coating layer; for example, at least 60%, 70%, 75%, 80% 85%, 90% or 95% of the glazing panel may be covered with the coating layer. This may provide a glazing panel with optical properties (for example reflection, colour in reflection, total visible light transmission, total energy transmission) which are substantially the same in each zone and preferably substantially the same over the entire visible surface of the glazing.

Preferably, the glazing panel comprises more than two electrically heatable zones, for example, 3, 4, 5, 6, 7, 8, 9, 10, 12, 15, 20, 30 or more zones.

Arranging for the conductive path of an electrically heatable zone to change direction at least once along its length within the electrically conductive coating layer so as to double back upon itself may enable the length of the conductive path to be designed independently of the size, shape or configuration of the glazing panel. This may allow the electrical resistance of the conductive path to be selected at different portions of the glazing panel without direct limitation to the height, shape or configuration of the glazing panel at the portion in question. In some embodiments, this may be used to achieve substantially even heating over the entire surface of the glazing panel, particularly where substantially the same voltage is applied across each electrically conductive heatable zone. The conductive path of an electrically heatable zone which changes direction at least once along its length within the electrically conductive coating layer so as to double back upon itself may be configured in the form of a loop, a u-shaped loop, an s-shaped loop or a snake-like loop.

Preferably, the glazing panel comprises at least two electrically heatable zones in which the conductive path changes direction at least once along its length within the electrically conductive coating layer so as to double back upon itself. In some embodiments, the length of the conductive path at these two electrically heatable zones, and preferably at all electrically heatable zones, is substantially the same.

The variation of temperature across at least two adjacent electrically heatable zones, more preferably across all electrically heatable zones of the glazing panel, may be less than 15° C. and preferably less than 12° C., 10° C., 8° C., 5° C. or 2° C. particularly when a voltage is applied across the coating layer of the glazing panel via first and second bus bars and after the glazing panel has reached stable or equilibrium conditions with its surroundings, the surroundings being at room temperature. In a particular embodiment of the glazing panel, the average temperature across all electrically heatable zones once equilibrium conditions have been reached is of about 40° C.

Alternatively, the glazing panel may be defined with preferential electrically heatable zones. The length of the conductive path of a preferential electrically heatable zone may be different from the length of the conductive path of another electrically heatable zone of the glazing panel so that, if required, this preferential zone may be heated more rapidly than the other heatable zone.

One or more electrically heatable zone may comprise a distinct pair of bus bars. The expression "distinct pair of bus bars" as used herein means that the bus bars serve only a single electrically heatable zone. Alternatively, one or more bus bars may be adapted so as to serve more than one electrically heatable zone.

The polarity of each of the bus bars may remain the same when a voltage is applied between the bus bars in use. Thus, in use, the direction of current flow in each conductive path may be constant. Preferably, the conductive paths have a fixed configuration, that is to say, the configuration of the conductive paths is not changed or varied during a heating cycle of the glazing. Preferably, the voltage is applied to all of the bus bars at the same time in order to favour a rapid and uniform heating of the glazing panel.

The electrically heatable zones may be delimited by one or more zone boundaries which are substantially insulating. The expression "substantially insulating" as used herein refers to a zone boundary which is less electrically conductive than the coating layer or which is substantially non conductive of electrical current.

A zone boundary may be provided by applying pattern wise over the conductive coating layer a material which is less conductive than the coating layer. Preferably, zone boundaries are provided by one or more non-coated portion of the glazing panel. The one or more non-coated portion may have an electrical resistance such that substantially no electrical current flows through it when a voltage is applied between the bus bars and thus may be substantially not conductive. The one or more non-coated portion may be provided by applying pattern wise to the substrate a masking agent before depositing the electrically conductive layer and removing subsequently the masking agent covered with the coating layer. Alternatively, the one or more non-coated portion may be provided by removal of the conductive coating layer after deposition. Advantageously, the coating layer may be removed with a laser, for example a laser DIODE. The zone boundaries may be substantially invisible to the naked eye, particularly if formed by laser removal of part of the coating layer. Advantageously, the width of the zone boundary is less than 150 μm, preferably less than 100 μm, more preferably less than 50 μm, most preferably less than 10 μm. A zone boundary may delimit or substantially delimit one electrically heatable zone from another electrically heatable zone. In order to avoid high current concentration in the non-conductive zone vicinity, it might be advantageous to design these zones by using smooth shapes, like curves or rounds.

The bus bars may be formed by deposition of a noble metal paste, for example a silver paste, or by deposition of a metallic ribbon.

Arranging the electrically conductive coating layer to be a solar control coating layer may enable the functions of preventing excessive passage of solar energy through the glazing to be combined with the heatability of the glazing panel. The term "solar control" refers herein to a coating layer which increases the selectivity of a substrate, that is, increases the ratio of incident visible light transmitted through a substrate to the incident solar energy transmitted through the substrate. Alternatively, the conductive coating layer may be a low emissivity coating.

The conductive coating layer may be deposited by a vacuum deposition technique, for example by magnetron sputtering, or be pyrolytically formed, for example by chemical vapour deposition. The coating layer is preferably applied over the entire surface or over the majority of the surface of the substrate.

In a preferred embodiment of the present invention, the coating film comprises at least one metallic infra-red reflective layer. The coating film may comprise a sequence of layers as follows: dielectric layer/silver/dielectric layer or dielectric layer/silver/dielectric layer/silver/dielectric layer. The dielectric layers may comprise, for example, tin oxide, zinc oxide, silicon nitride, titanium oxide, aluminium oxide or mixtures of one or more thereof.

The electrically conductive coating layer preferably has a resistance lower than 100 ohms per square, preferably lower than 25 ohms per square, for example, 0.1, 0.5, 1.3 2.2, 3.0, 15 or 20 ohms per square.

In the glazing panel according to the present invention, the substrate may be glass, for example a sheet of flat glass, soda lime glass or float glass, particularly a sheet of glass intended for subsequent use as or incorporated in an architectural or vehicle glazing panel. It may undergo a thermal toughening treatment, a chemical tempering treatment or a bending treatment before or after the coating layer has been deposited onto at least part of its surface. Alternatively, the substrate may be a rigid or flexible plastics sheet material which may equally be intended for subsequent use as or incorporated in an architectural or vehicle glazing panel.

The electrically conductive coating layer may be provided directly at a surface of the substrate, alternatively, it may be carried by a film, for example, a PET or other plastics sheet material incorporated in a glazing panel.

The present invention is particularly applicable to a glazing panel of substantially irregular shape, that is, a glazing panel which has an acute angle α formed by the lower edge of the glazing panel and by the tangent to a side edge, particularly where α is less than or equal to 60°, 55°, 45°, 40°, 35°, 30°, 25°, 20° or 15° and even more particularly where the first and second bus bars are positioned along or adjacent to those edges. In one embodiment of the invention, at least one edge of the glazing panel may be substantially curved.

The glazing panel may be a side window of a vehicle or a train, a windshield of an aircraft or a glazing panel with applications in the nautical field.

The glazing panel may be adapted to have a voltage of between 10 and 100 volts applied across the bus bars, preferably between 14 and 50 volts. For automobile applications, a voltage of 32 volts, more preferably 36 volts, most preferably 42 volts, is applied. Alternatively, the glazing panel may be adapted to have a voltage of between 10 and 14 volts applied across the bus bars, for example about 12 volts. The heat generated by the zone heatable electrically is preferably comprised between 250 and 2000 watts per square meter.

In embodiments in which more than one pair of spaced bus bars are provided, the glazing panel may be adapted to have the same or substantially the same voltage applied across each pair of bus bars.

Particularly where the glazing panel is provided in monolithic form, the electrically conductive coating layer may be partially or entirely covered with an additional external coating (which is preferably substantially non electrically conductive), for example a lacquer. This may prevent the electrically conductive coating from being an exposed coating layer and may serve:
  to provide electrical insulation between the electrically conductive coating and its surroundings; and/or
  to protect the electrically conductive coating from abrasion; and/or
  to reduce tendencies for the electrically conductive coating and/or the zone boundaries to accumulate dirt and/or to become difficult to clean.

In order to give the sheets the mechanical strength that, at least for the thin sheet, especially allows them to undergo the bending required by the assembly process, without running the risk of exceeding withstandable stresses, the threshold of these stresses is advantageously increased by tempering these sheets.

According to one embodiment of the present invention, the outer glass sheets is thermally tempered especially for reasons of cost, advantage being taken of the temperature reached in the production process. A thermal temper is obtained by rapidly cooling the faces of the sheet, by blowing air at room temperature onto them. The surface of the sheet cools first whereas its bulk cools down more slowly. This operation is that which leads the thick sheet to the tempered or semi-tempered state depending on the conditions of implementation of this operation. For very thin sheets, the temperature gradient between the surface and bulk during forced cooling is often not steep enough to achieve the sought-after stress level. For the reasons given above, the thin sheet is preferably chemically tempered. This type of temper allows the sought-after stresses to be obtained even with sheets of small thickness. The chemical temper is carried out under conditions that are conventional for this type of treatment, especially by exchanging sodium ions for potassium ions on the surface of the sheet.

The arrangement according to the invention, whereby only the thick sheet is fastened and optionally machined, prevents difficulties due to the lamination and to the presence of the thin sheet. The glazing unit behaves like a monolithic glazing unit in its non-laminated portion and elsewhere preserves all the functionalities that may be obtained with laminated glazing units.

Laminated assemblies in which the edges of one of the glass sheets are slightly set back from those of the other sheet are also known from the prior art. This arrangement is for example employed when it is envisioned to adhesively bond the glazing unit via the sheet using the uncovered edge. As in the preceding case, the arrangements described do not include the use of sheets assembled under the conditions of the invention. The partially laminated structure of glazing units according to the invention allows the glazing unit to be fastened even if this requires the unit to be machined, for example with holes intended to interact with mechanical means. The size of this non-laminated portion may be relatively limited relative to the total area of the glazing unit. It is not necessary, or even desirable, for this portion to extend further than is actually necessary to produce the means for fastening the thick sheet. In practice, the non-laminated portion preferably represents no more than 20% of the area of the thick sheet, and particularly preferably no more than 10% of this area.

In order to allow the fastening means of the glazing unit to be suitably arranged, the non-laminated area will nevertheless be a certain size. It is preferably at least 0.5% of the area of the largest sheet, and more often at least 1% of this area.

In certain respects, the presence in the glazing unit according to the invention of a sheet that undergoes no other heat treatment than that used to join the sheets to their interlayer makes it easier to insert means providing additional functionalities. This is in particular the case for means sensitive to high temperatures. The assembly operation is carried out in the conventional way and the temperatures reached are not higher than those required to allow the interlayer sheet to adhesively bond. These temperatures are ordinarily about 120-130° C., and ordinarily do not exceed 150° C.

Under these conditions it is possible to use the thin sheet as a carrier, especially of thin heat-sensitive layers. This is for example the case of low-emissive layers comprising metal layers that reflect IR. The layers in question are deposited by vacuum cathode sputtering. In the implementation of these processes, if the sheet is so thin that it cannot itself guarantee its planarity during the deposition, this sheet may be placed on a thicker sheet the only function of which is to support the thin sheet.

In heat treatments such as bending/tempering treatments, temperatures as high as about 650-700° C. are reached. At these temperatures, metal layers, especially layers based on silver, must be protected by particular systems that are sometimes difficult to produce. Applying the layers in question to a previously bent glass sheet raises other problems, especially with the uniformity of such coatings, such that it is generally preferred to apply these layers to flat sheets, and therefore to subject these layers to the thermal conditions applied to shape the glass sheet. However, such treatment may substantially alter the properties of the layers, and to prevent such alterations said systems of layers must have very particular structures. In contrast, applying layers that are relatively susceptible to heat to sheets according to the invention that are not subjected to these treatments, prevents any alteration of these layers.

In practice, if it is desired to use this type of layers, both solutions are possible. The layers are either on the thick sheet (or more precisely on the portion of the latter that is then laminated, i.e. that makes contact with the interlayer) and in this case they are exposed to the bending/tempering operations, or else these layers are on the thin sheet on that face of the latter which makes contact with the interlayer.

The invention claimed is:

1. An electrically heatable laminated automotive glazing unit comprising:
   an exterior glass sheet that is curved and tempered,
   a thin interior glass sheet that is also tempered, the exterior and interior glass sheets being joined by a thermoplastic interlayer sheet, and
   an electrically heatable zone comprising:
   i) a substantially transparent, electrically conductive coating layer,
   ii) spaced busbars adapted to supply electrical voltage across the substantially transparent, electrically conductive coating layer,
   wherein the glazing unit is configured to receive mechanical moving and/or fastening means and a portion of the exterior glass sheet is not covered by the thin interior glass sheet, and the glazing unit is fastened in the portion not covered by the thin interior glass sheet, and
   wherein the spaced busbars are placed in the portion of the exterior glass sheet which is not covered by the thin interior glass sheet.

2. The glazing unit according to claim 1, wherein a ratio of thicknesses of the exterior glass sheet to the interior glass sheet is from 5/1 to 12/1.

3. The glazing unit according to claim 1, wherein the electrically conductive coating layer has a conductive path defined between the bus bars, in which, in the electrically heatable zone the conductive path changes direction at least once along its length within the electrically conductive coating layer so as to double back upon itself.

4. The glazing unit according to claim 1, wherein the exterior glass sheet has a thickness that is not larger than 5 mm.

5. The glazing unit according to claim 1, wherein the thin interior glass sheet has a thickness that is not larger than 1 mm.

6. The glazing unit according to claim 1, wherein the thin interior glass sheet has a thickness that is not smaller than 0.2 mm.

7. The glazing unit according to claim 1, wherein the thin interior glass sheet does not have a significant curvature before the thin interior glass sheet is joined to the curved exterior glass sheet.

8. The glazing unit according to claim 1, wherein the thin interior glass sheet is chemically tempered.

9. The glazing unit according to claim 1, wherein the thin interior glass sheet is coated on its face turned toward the interlayer sheet with a set of functional layers having athermic properties.

10. The glazing unit according to claim 1, wherein the portion where the exterior glass sheet is not covered by the interior glass sheet represents no more than 20% of an area of the exterior glass sheet.

11. The glazing unit according to claim 1, wherein portions where the exterior and interior glass sheets do not overlap represents at least 0.5% of an area of the exterior glass sheet.

12. The glazing unit according to claim 1, wherein the exterior glass sheet comprises, in a non-laminated portion, a hole configured to receive means for fastening/moving the glazing unit.

13. The glazing unit according to claim 1, wherein the glazing unit forms a movable side window.

14. The glazing unit according to claim 1, wherein the glazing unit is a carrier for additional elements requiring the glazing unit to be machined.

15. An electrically heatable laminated automotive glazing unit configured to form a side window comprising:
   an exterior glass sheet that is curved and tempered,
   an interior glass sheet that is also tempered, the exterior and interior glass sheets being joined by a thermoplastic interlayer sheet, and
   an electrically heatable zone comprising:
   i) a substantially transparent, electrically conductive coating layer,
   ii) spaced busbars adapted to supply electrical voltage across the substantially transparent, electrically conductive coating layer,
   wherein the glazing unit is configured to receive mechanical moving and/or fastening means and a portion of the exterior glass sheet is not covered by the interior glass sheet, and the glazing unit is fastened in the portion not covered by the interior glass sheet,
   wherein the spaced busbars are placed in the portion of the exterior glass sheet which is not covered by the interior glass sheet, and
   wherein the exterior glass sheet has a thickness that is not larger than 5 mm and the interior glass sheet has a thickness that is not larger than 1 mm.

16. The glazing unit according to claim 15, wherein the electrically conductive coating layer has a conductive path defined between the bus bars, in which, in the electrically heatable zone the conductive path changes direction at least once along its length within the electrically conductive coating layer so as to double back upon itself.

17. The glazing unit according to claim 15, wherein the interior glass sheet is coated on its face turned toward the interlayer sheet with a set of functional layers having athermic properties.

18. The glazing unit according to claim 15, wherein the portion where the exterior glass sheet is not covered by the interior glass sheet represents no more than 20% of an area of the exterior glass sheet.

19. The glazing unit according to claim 15, wherein a ratio of thicknesses of the exterior glass sheet to the interior glass sheet is from 5/1 to 12/1.

20. The glazing unit according to claim 15, wherein the glazing unit forms a movable side window.

21. The glazing unit according to claim 15, wherein the busbars are located on a lower part of the exterior glass sheet that is not covered by the interior glass sheet.

* * * * *